(12) United States Patent
Wang et al.

(10) Patent No.: US 11,555,737 B2
(45) Date of Patent: Jan. 17, 2023

(54) OPTOELECTRONIC MEASURING DEVICE

(71) Applicants: Yu-Yen Wang, Taoyuan (TW);
Kuo-Wei Huang, Taoyuan (TW);
Szu-Yuan Weng, Taoyuan (TW)

(72) Inventors: Yu-Yen Wang, Taoyuan (TW);
Kuo-Wei Huang, Taoyuan (TW);
Szu-Yuan Weng, Taoyuan (TW)

(73) Assignee: CHROMA ATE INC., Taoyuan (TW)

( * ) Notice: Subject to any disclaimer, the term of this patent is extended or adjusted under 35 U.S.C. 154(b) by 245 days.

(21) Appl. No.: 16/882,489

(22) Filed: May 24, 2020

(65) Prior Publication Data

US 2020/0378826 A1 Dec. 3, 2020

(30) Foreign Application Priority Data

May 31, 2019 (TW) .................................. 108118966

(51) Int. Cl.
*G01J 1/42* (2006.01)
*G01J 1/04* (2006.01)
*G01J 1/44* (2006.01)

(52) U.S. Cl.
CPC ............ *G01J 1/4257* (2013.01); *G01J 1/0411* (2013.01); *G01J 1/0414* (2013.01); *G01J 1/44* (2013.01)

(58) Field of Classification Search
CPC ....... G01J 1/4257; G01J 1/0411; G01J 1/0414
See application file for complete search history.

(56) References Cited

U.S. PATENT DOCUMENTS

| 4,212,540 | A | * | 7/1980 | Stakun | ................... | G01B 11/26 356/521 |
| 5,017,004 | A | * | 5/1991 | Cross | .................... | G01J 1/4257 356/121 |
| 5,521,374 | A | * | 5/1996 | Cray | ..................... | G01J 1/4257 356/123 |
| 6,624,424 | B2 | * | 9/2003 | Eckert | .................... | G01J 1/429 250/372 |
| 7,477,438 | B2 | * | 1/2009 | Herkommer | .......... | G01J 1/4257 359/223.1 |

(Continued)

FOREIGN PATENT DOCUMENTS

JP  2001004491 A * 1/2001

OTHER PUBLICATIONS

Google translation of JP-20011004491-A.*

*Primary Examiner* — Shawn Decenzo

(57) ABSTRACT

Herein disclosed is an optoelectronic measuring device. The optoelectronic measuring device comprises an objective lens, an imaging lens, a camera, and an optical path adjusting module which are disposed at the first light path. The objective lens receives a first testing light, and transforms the first testing light into a second testing light. The imaging lens receives the second testing light, and transforms the second testing light into a third testing light. The camera measures a beam characteristic of the third testing light. The optical path adjusting module, disposed between the imaging lens and the camera, comprises a mirror, the mirror moves relatively to the imaging lens according to a test command, and adjusts the distance between the imaging lens and the camera at the first light path to be a first optical distance or a second optical distance. Wherein the mirror reflects the third testing light vertically.

7 Claims, 2 Drawing Sheets

(56) References Cited

U.S. PATENT DOCUMENTS

| | | | |
|---|---|---|---|
| 2003/0150997 A1* | 8/2003 | Eckert | G01J 1/4257 250/372 |
| 2004/0017624 A1* | 1/2004 | Herkommer | G01J 1/4257 359/857 |
| 2004/0207853 A1* | 10/2004 | Govorkov | G01J 9/0246 356/450 |
| 2008/0309926 A1* | 12/2008 | Weber | G02B 27/0933 356/121 |
| 2010/0103962 A1* | 4/2010 | Ando | G01J 1/08 372/50.1 |
| 2012/0086936 A1* | 4/2012 | Hall | G01M 11/061 356/122 |
| 2016/0197453 A1* | 7/2016 | Luo | H01S 5/0014 356/73 |
| 2018/0164089 A1* | 6/2018 | Schönleber | G01B 9/02072 |
| 2018/0245977 A1* | 8/2018 | Sobolev | G01J 3/0291 |

* cited by examiner

OPTOELECTRONIC MEASURING DEVICE

CROSS REFERENCE TO RELATED APPLICATION

The present application claims priority to Taiwan patent application Serial No. 108118966 filed on May 31, 2019, the entire content of which is incorporated by reference to this application.

BACKGROUND OF THE INVENTION

1. Field of the Invention

The present invention pertains to a measuring device for electronic units, more specifically to an optoelectronic measuring device for detecting characteristics of optoelectronics.

2. Description of the Prior Art

With the advancement of optoelectronics technology, nowadays it is well-known that lasers could be produced by several media. For example, lasers could be produced by gas, chemicals or semiconductors, etc. Currently on the market, it is common to produce laser by semiconductors which are generally referred to as laser diodes. In practice, after the manufacture of laser diodes is completed, many optical detections are required afterward to ensure the stability of the laser quality. However, when detecting the laser light beam emitted from the laser diode, several measurements would require frequently moving the objective plane of an objective lens or the imaging plane of an imaging lens. These measurements could be near field parameters that are related to beam characteristics, such as beam waists, divergence angles, and numerical apertures (NA), etc. It is understandable for a person having ordinary skill in the art that the frequent movement of the objective lens or imaging lens would cause the instability of the measurement in the optical framework and easily produce errors in the measurement.

In addition, many of the measurements of the laser diodes require their respective test stations, including those for detecting said near field parameters, such as said laser beam, beam waists, divergence angles, and numerical apertures. In practice, these measurements are not integrated with the test stations for luminance-current-voltage (LIV) measurement. Generally speaking, as there are many test stations and the shipping route is complex, it is easy to cause damage unexpectedly in the transition of the laser diodes; in practice, it may occupy much factory space as well. Accordingly, there is a need for a new device for measuring optoelectronic units in industry to not only maintain the stability of the objective lens and the imaging lens during the measuring process but also integrate many measurements to save factory space.

SUMMARY OF THE INVENTION

The present invention provides an optoelectronic measuring device for detecting multiple measurements of a laser diode while maintaining the stability of an objective lens and an imaging lens during the measuring process.

The present invention discloses an optoelectronic measuring device, which comprises an objective lens, an imaging lens, a camera, and an optical path adjusting module. The objective lens is disposed on a first light path for receiving a first testing light and transforming the first testing light into a second testing light. The imaging lens is disposed on the first light path for receiving the second testing light and transforming the second testing light into a third testing light. The camera is disposed on the first light path for measuring a beam characteristic of the third testing light. The optical path adjusting module is disposed on the first light path and between the imaging lens and the camera, wherein the optical path adjusting module comprises a mirror disposed on the first light path, the mirror moves relatively to the imaging lens according to a test command, and adjusts the distance between the imaging lens and the camera on the first light path to be a first optical distance or a second optical distance. Wherein the mirror reflects the third testing light vertically.

In one embodiment, when the camera measures the beam characteristic of the third testing light, the camera may measure a beam waist, a divergence angle and a numerical aperture of the third testing light. Furthermore, when the optical path adjusting module moves according to the test command, a relative position between the imaging lens and the camera remains unchanged.

In one embodiment, the optoelectronic measuring device further comprises a first filter disposed on the first light path and between the objective lens and the imaging lens for reducing the light intensity of the second testing light. Besides, the camera may be generally disposed at a focal plane of a light exiting side of the imaging lens on the first light path. Alternatively, the first testing light may be emitted from a laser diode, and the laser diode is disposed at a focal plane of a light incident side of the objective lens on the first light path.

In one embodiment, the optoelectronic measuring device further comprises a first beam splitter and a luminance-current-voltage testing module. The first beam splitter disposed on the first light path to split the second testing light into a fourth testing light. The luminance-current-voltage testing module is configured to perform a luminance-current-voltage test on the fourth testing light to determine an operating characteristic of a laser diode.

Based on the above, the optoelectronic measuring device provided in the present invention is able to change the distance between the imaging lens and the camera by adjusting the optical path adjusting module, such that it is not required to move the objective lens or the imaging lens and that the stability of the optical framework will be maintained. In addition, as the intensity of the laser light beam emitted from the laser diode is very high, in practice most of the laser light beam would be removed from the optical framework to avoid overexposure in the camera. Notably, the optoelectronic measuring device provided in the present invention may utilize the laser light beam, which is supposed to be filtered out, and direct such laser light beam into the luminance-current-voltage testing module, thereby carrying out the goal of integrating multiple measurements.

BRIEF DESCRIPTION OF THE APPENDED DRAWINGS

DETAILED DESCRIPTION OF THE INVENTION

The features, objections, and functions of the present invention are further disclosed below. However, it is only a few of the possible embodiments of the present invention, and the scope of the present invention is not limited thereto; that is, the equivalent changes and modifications done in accordance with the claims of the present invention will remain the subject of the present invention. Without departing from the spirit and scope of the invention, it should be considered as further enablement of the invention.

Figure 1:
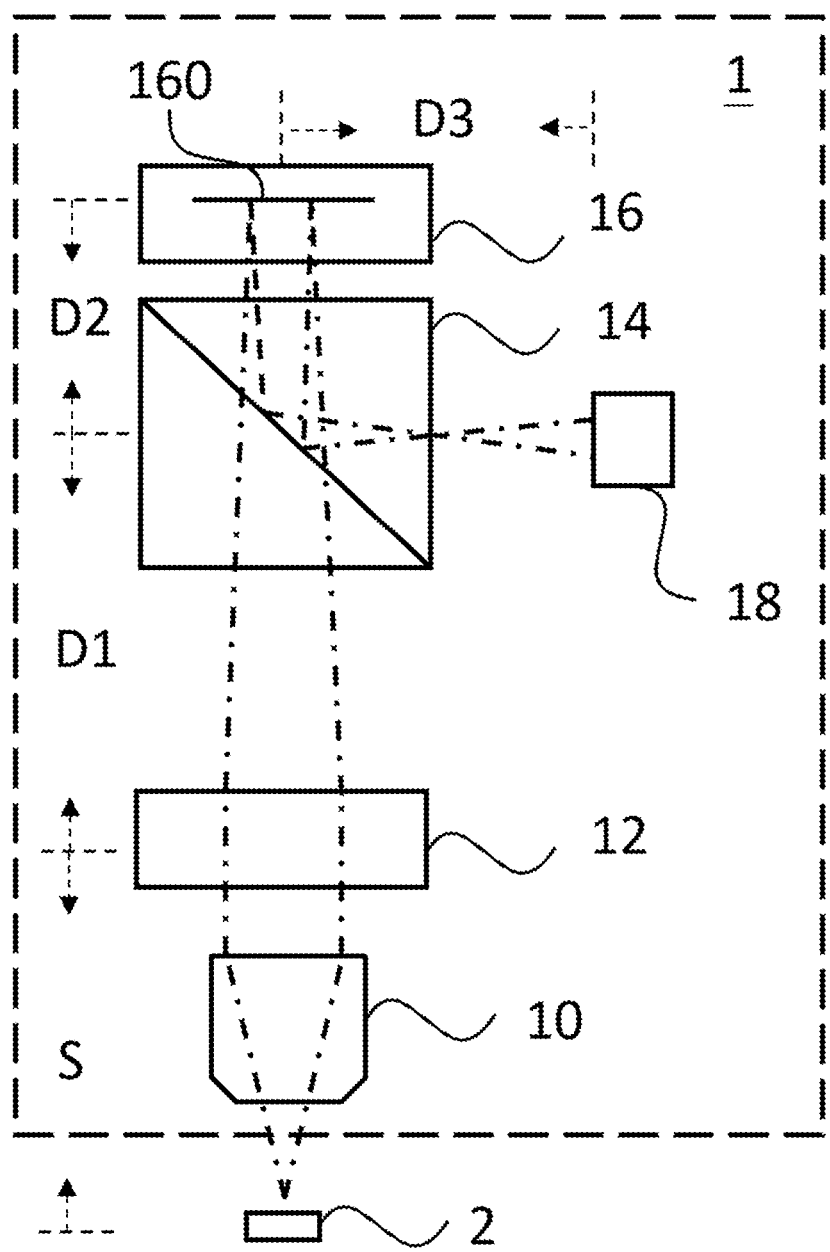
FIG. 1 is a schematic framework diagram of an optoelectronic measuring device in accordance with an embodiment of the present invention.

Please refer to FIG. 1, a schematic framework diagram of an optoelectronic measuring device in accordance with an embodiment of the present invention. As shown in FIG. 1, the optoelectronic measuring device 1 in the present embodiment is used to measure characteristics of optoelectronic units. The optoelectronic unit may be a laser diode 2 in FIG. 1. The present embodiment does not limit the types of the optoelectronic units which may also be gas laser units or chemical laser units. The optoelectronic measuring device 1 may be used to measure beam characteristics of the laser diode 2 and particularly may be used to measure near field parameters of the laser light beam emitted from the laser diode 2. For example, the optoelectronic measuring device 1 may be used to measure the near field parameters, such as a beam waist (W0) of the laser light beam, a divergence angle (θ), and a numerical apertures (NA), etc. In general, the measurement of the laser diode 2 requires the objective lens or the imaging lens to be moved within a certain range while scanning, whereas the present embodiment provides an optical framework that does not require the movement of the objective lens or the imaging lens. The optoelectronic measuring device 1 as shown in FIG. 1 comprises an objective lens 10, an imaging lens 12, a beam splitter 14, an optical path adjusting module 16, and a camera 18, wherein the objective lens 10, the imaging lens 12, the beam splitter 14, the optical path adjusting module 16, and the camera 18 are disposed on the first light path. The units disposed on the first light path are illustrated respectively as follows.

The objective lens 10 is disposed on the first light path to receive a laser light (i.e. a first testing light) emitted from the laser diode 2. In FIG. 1, the dash-dotted lines between the laser diode 2 and the objective 10 are used to illustrate that the first testing light propagates along the first light path into the optoelectronic measuring device 1. The present embodiment does not limit the sizes of the objective lens 10 and the laser diode 2, and the angle that the laser diode 2 emits the first testing light. As an appropriate lens is not yet installed on the laser diode 2, the laser light beam (i.e. the first testing light) emitted from the laser diode 2 is not parallel light, which is different from laser emitters which are already assembled. A person having ordinary skill in the art would understand that if a light source is disposed on one side of a focal plane of a convex lens, then according to optical properties of the convex lens, the light emitted from the light source may be transformed into a parallel light and then emitted from the other side of the convex lens. In another embodiment, the objective lens 10 may be a convex lens, and the laser diode 2 may be disposed at the focal plane of the light incident side of the objective lens 10, such that an unparallel laser light beam (i.e. the first testing light) may be transformed into a parallel laser light beam (i.e. a second testing light). In other words, the objective lens 10 may transform the first testing light into the second testing light having a parallel light property.

In addition, the imaging lens 12 is disposed on the first light path as well to receive the parallel laser light beam (i.e. the second testing light) emitted from the objective lens 10. As shown in FIG. 1, the dash-dotted lines between the objective lens and the imaging lens 12 are used to illustrate that the second testing light propagates along the first light path into the imaging lens 12. In practice, the imaging lens 12 may be a tube lens. In the present embodiment, the types of the imaging lens 12 are not limited. Additionally, as the laser light beam is transformed into the parallel laser light beam, in theory such parallel laser light beam may propagate to any distance along its straight path; that is, the length of the first light path is extended. For example, the extension of the first light path may be regarded as the increase of the distance between the objective lens 10 and the imaging lens 12, therefore it is possible to dispose more and different types of optical units between the objective lens 10 and the imaging lens 12. However, a person having ordinary skill in the art would understand that as the parallel light will not be focused (or does not have a focus), an image will not be formed. Accordingly, the imaging lens 12 may be a convex lens having a focal plane, and after the parallel laser light beam propagates through the imaging lens 12, the parallel laser light beam may be transformed into an unparallel laser light beam (i.e. a third testing light) which is able to form an image and be measured.

FIG. 1 illustrates a beam splitter 14, configured to receive the third testing light transmitted from the imaging lens 12, and the incident third testing light may penetrate to the optical path adjusting module 16. After the third testing light is reflected by the optical path adjusting module 16, it may be transmitted back to the beam splitter 14 along the original path in the opposite direction. As shown in FIG. 1, the dash-dotted lines between the imaging lens 12 and the beam splitter 14 are used to illustrate that the third testing light propagates along the first light path into the beam splitter 14, and the dash-dotted lines further penetrate from the beam splitter 14 to the optical path adjusting module 16. After reflecting by the optical path adjusting module 16, the dash-dotted lines are again transmitted from the optical path adjusting module 16 back to the beam splitter 14. In practice, as the third testing light is already an unparallel laser light beam which may be focused along the propagation of the light beam, it is observable that when the optical path adjusting module 16 reflects the third testing light, the cross-sectional area of the third testing light would be smaller than that emitted from the imaging lens 12. Then, after the beam splitter 14 receives the third testing light reflected from the optical path adjusting module 16, the beam splitter 14 may direct the reflected third testing light toward the camera 18. In one embodiment, the optical path adjusting module 16 may include a mirror 160 and a motor or a platform to adjust the mirror 160, wherein the mirror 160 may be configured to reflect the third testing light. In the present embodiment, the shape of the mirror 160 or the position of the mirror 160 in the optical path adjusting module 16 are not limited; as long as the mirror 160 may be configured to reflect third testing light, the mirror 160 would fall within the scope of the present embodiment.

The camera 18 is disposed on the first light path as well to measure the beam characteristics of the third testing light emitted from the beam splitter 14. As shown in FIG. 1, the dash-dotted lines between the beam splitter 14 and the camera 18 are used to illustrate that the third testing light reflected by the mirror 160 of the optical path adjusting module 16 is emitted from the beam splitter 14 into the camera 18. It is worth mentioning that the beam splitter 14 may not be required in the present embodiment. For example, the third testing light emitted from the imaging lens 12 may be directly reflected by the mirror 160 of the optical path adjusting module 16. A person having ordinary skill in the art would understand that when there is a beam splitter 14, the normal line of the mirror 160 may be just opposite to the incident direction of the third testing light, such that the incident angle of the third testing light on the mirror 160 may be zero, and that the third testing light may be reflected by 180 degree opposite to the original incident direction. In addition, when the beam splitter 14 is unavailable, by calculating the incident angle and the emission angle of the third testing light on the mirror 160 and positioning the camera 18 in an appropriate location, it should be easy to receive the third testing light reflected by the mirror 160 of the optical path adjusting module 16. To facilitate the understanding of the present embodiment, the beam splitter 14 of the optoelectronic measuring device 1 as shown in FIG. 1 is still used for illustration in the following.

In one embodiment, the camera 18 may be disposed on the focal plane at the light exiting side of the imaging lens 12; that is, the distance between the imaging lens 12 and the camera 18 on the first light path may be the focus length of the imaging lens 12. In other words, as the third testing light is focused at the position of the camera 18, an image may be formed on the camera 18, such that the camera 18 may be configured to measure the beam characteristics of the third testing light. For example, the camera 18 may measure near field parameters such as the beam waist, the divergence angle, and the numerical aperture of the third testing light.

In a more practical example, in the measurement of the beam waist, the distance between the imaging lens 12 and the camera 18 on the first light path (i.e. the optical path of the third testing light) may be slightly adjusted to obtain the near field parameters such as the beam waist, the divergence angle, and the numerical aperture. As shown in the example illustrated in FIG. 1, the optical path of the third testing light is the distance between the imaging lens 12 and the camera 18 on the first light path. FIG. 1 includes a distance D1 that the third testing light transmits from the imaging lens 12 to the beam splitter 14, a distance D2 that the third testing light transmits from the beam splitter 14 to mirror 160 of the optical path adjusting module 16, and a distance D3 that the third testing light transmits from the beam splitter 14 to the camera 18. Note that when the third testing light is reflected by the mirror 16 to the beam splitter 14, it would again pass the distance D2. That is, the optical path of the third testing light may be simply denoted as D1+2D2+D3.

To change the distance between the imaging lens 12 and the camera 18 on the first light path, the mirror 160 of the optical path adjusting module 16 may move relatively to the imaging lens 12 according to a test command. For example, the mirror 160 may move toward the imaging lens 12 with a distance d or way from the imaging lens 12 with the distance d. When the mirror 160 moves toward the imaging lens 12 with the distance d, the distance that the third testing light transmits from the beam splitter 14 to the optical path adjusting module 16 would be reduced by d; thus the optical path of the third testing light may further be denoted as D1+2(D2−d)+D3 (e.g. may be referred to as a first optical path). On the other hand, when the mirror 160 moves away from the imaging lens 12 with a distance d, the distance that the third testing light transmits from the beam splitter 14 to the optical path adjusting module 16 would be increased by d, thus the optical path of the third testing light may further be denoted as D1+2(D2+d)+D3 (e.g. may be referred to as a second optical path).

A person having ordinary skill in the art would understand that according to principles of optical imaging while the focal length of a lens is not changed, the active change of the distance (i.e. imaging distance) from an imaging plane to the lens would simultaneously cause the change of the distance (i.e. objective distance) from an objective plane to the lens. In other words, in the present embodiment with the unchanged focal lengths of the objective lens 10 and the imaging lens 12, the depth (i.e. objective distance) of the laser diode 2 under scanning may be changed correspondingly by moving the mirror 160 to change the optical path (i.e. the imaging distance) of the third testing light. Herein, the operating principle of the present embodiment may be briefly illustrated according to the following imaging formula:

$$1/S+1/D=1/f$$

In the imaging formula above, f indicates a combined focal length of the objective lens 10 and the imaging lens 12. S indicates the objective distance which is an imaging plane distance S of the objective lens 10 as shown in FIG. 1, and the imaging plane distance S indicates the distance for scanning of the laser diode 2. D indicates the imaging distance which is the optical path between the imaging lens 12 and the camera 18 (i.e. the aforementioned D1+2D2+D3). As the combined focal length of the objective lens 10 and the imaging lens 12 is fixed in the present embodiment, it is observable that there is a linkage relationship between S and D. Considering the above as example, if the mirror 160 moves toward the imaging lens 12 with the distance d, then D in the aforementioned formula could be substituted by D1+2(D2−d)+D3; as f and D are already known, the imaging plane distance S can be calculated and denoted as S1. If the mirror 160 moves away from the imaging lens 12 with the distance d, then D in the aforementioned formula can be substituted by D1+2(D2+d)+D3; similarly, as f and D are already known, the imaging plane distance S can be calculated and denoted as S2. Apparently, S1 and S2 are not the same, and the distance difference between S1 and S2 is a perpendicular imaging plane depth that the optoelectronic measuring device 1 is able to scan.

Additionally, according to the above description, the changeable range of the optical path between the imaging lens 12 and the camera 18 on the first testing light may be four times of the moving distance d of the mirror 160 (i.e. the changeable range may be +2d to −2d). Certainly, while this back-and-forth movement is described as an example in the present embodiment, the mirror 160 is not limited to a symmetric movement. Also, as the intensity of the laser beam emitted from the laser diode 2 may be very high, to avoid an over exposure in the camera 18, the optoelectronic measuring device 1 may further includes one or many filter(s), such one or many filter(s) may be, for example, disposed between the objective lens 10 and the imaging lens 12, which is not limited in the present embodiment.

It is worth mentioning that traditionally in order to achieve a certain depth for scanning a laser diode, it would require moving the whole optical framework to change the objective distance between the objective lens and the laser diode; take the above as an example, to make the imaging lens and the camera yield the changeable range of the optical path to be 4d (i.e. +2d to −2d) on the first light path, the imaging lens or the camera may be required to move for 4d in total to yield the change of the objective distance to be 4d (i.e. +2d to −2d). However, in the present embodiment, as the distance from the beam splitter 14 to the mirror 160 of the optical path adjusting module 16 is D2, the distance reflected from the mirror 160 to beam splitter 14 is also D2; thus, the changeable range of +2d to −2d of the optical path between the imaging lens 12 and the camera 18 on the first testing light may be achieved simply by moving the mirror 160 with a distance of 2d (i.e. +d to −d). Accordingly, due to the reduced moving distance of the mirror 160, not only the movement of the objective lens 10 and the imaging lens 12 may be unnecessary in the present embodiment, but the measuring rate is also much faster than the traditional methods. In addition, as the weight of the mirror 160 may be quite light and its volume may be quite small, the present embodiment is more capable of utilizing a controlling platform with a very high precision to move the mirror 160, thereby further improving the accuracy of the measurement as well.

Figure 2:
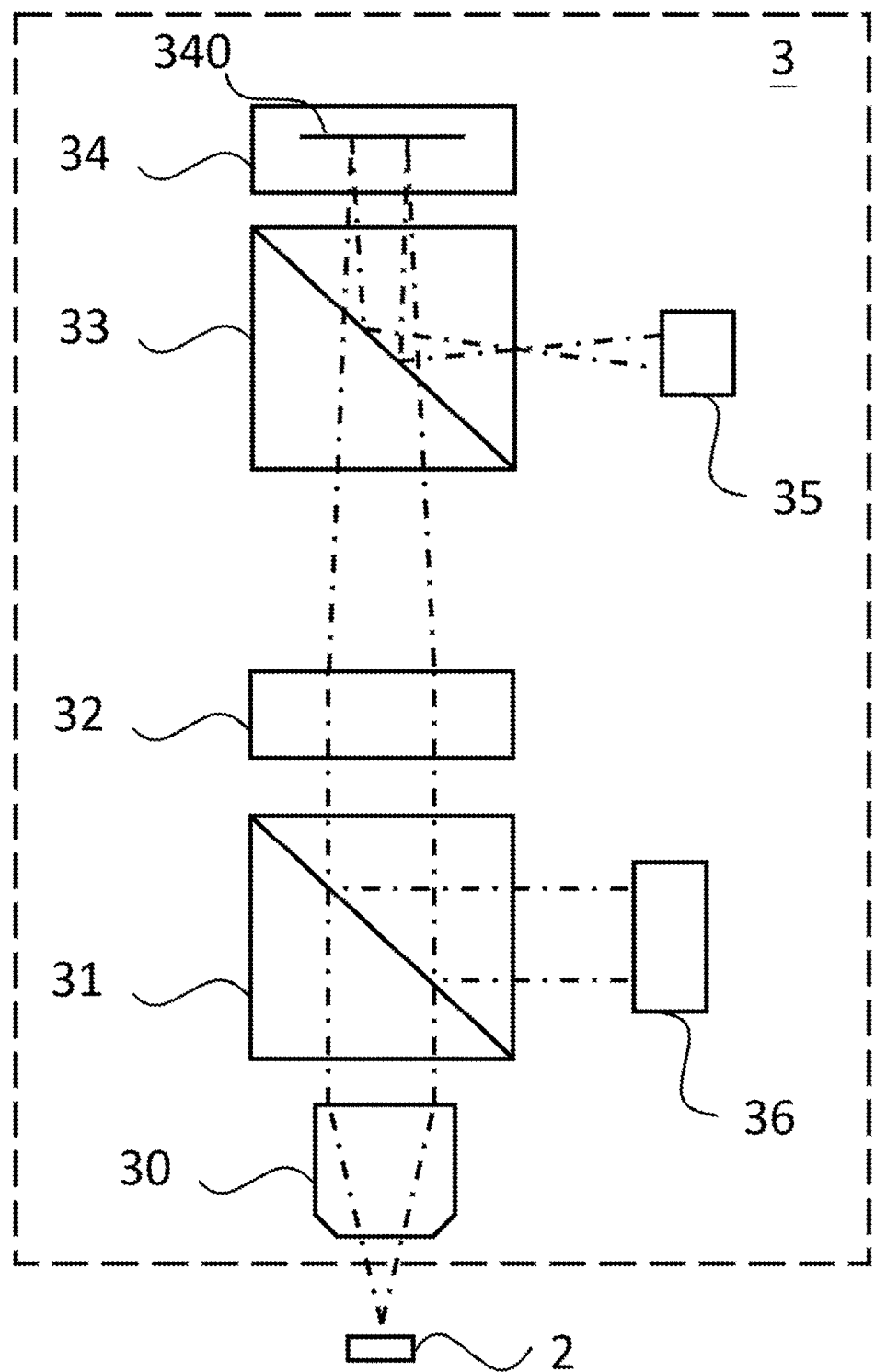
FIG. 2 is a schematic framework diagram of an optoelectronic measuring device accordance with another embodiment of the present invention.

On the other hand, the present embodiment may further be integrated with a measurement equipment to measure luminance-current-voltage (LIV) in the optical path. Please refer to FIG. 2, a schematic framework diagram of an optoelectronic measuring device in accordance with another embodiment of the present invention. Similar to FIG. 1, the optoelectronic measuring device 3 as shown in FIG. 2 also comprises an objective lens 30, an imaging lens 32, a beam splitter 33, an optical path adjusting module 34, and a camera 35. The objective lens 30, the imaging lens 32, the beam splitter 33, the optical path adjusting module 34, and the camera 35 are disposed on the first light path. Additionally, the objective lens 30 may similarly be used to receive a laser light beam (i.e. a first testing light) emitted from the laser diode 2 and transform the unparallel laser light beam (i.e. the first testing light) into a parallel laser light beam (i.e. a second testing light). The imaging lens 32 may also be configured to receive the parallel laser light beam emitted from the objective lens 30 and transform the parallel laser light beam into an unparallel laser light beam (i.e. a third testing light).

Besides, the beam splitter 33 may also be used to receive the third testing light transmitted from the imaging lens 32, and the incident third testing light may penetrate to the optical path adjusting module 34. The optical path adjusting module 34 may include a mirror 340 configured to reflect the third testing light, and similarly the mirror 340 may move relatively to the imaging lens 32 according to a test command. The camera 35 may similarly be used to measure beam characteristics of the third testing light, such as the near field parameters including the beam waist, the divergence angle and the numerical aperture of the third testing light, etc. For other descriptions of the objective lens 30, the imaging lens 32, the beam splitter 33, the optical path adjusting module 34, and the camera 35, please refer to the objective lens 10, the imaging lens 12, the beam splitter 14, the optical path adjusting module 36, and the camera 18 described in the previous embodiment, which will not be repeated here.

Different from FIG. 1, the optoelectronic measuring device 3 as shown in FIG. 2 further includes a beam splitter 31 (i.e. a first beam splitter) and a luminance-current-voltage testing module 36. The beam splitter 32 is disposed on the first light path and between the objective lens 30 and the imaging lens 32. As motioned before, as the intensity of the laser light beam emitted from the laser diode 2 is very high, the optoelectronic measuring device 3 may not only include one or more filter(s) (not shown) but also use the beam splitter 31 to direct a certain ratio of the laser light beam out of the first light path (i.e. to split the laser light beam into a fourth testing light). Thus, the number of filters disposed on the first light path may be reduced or lighter filters may be disposed. In one example, the beam splitter 31 may not only help reduce a portion of the laser light beam on the first light path, but the laser light beam directed out of the first light path may also be received by the luminance-current-voltage testing module 36. In practice, the luminance-current-voltage testing module 36 may perform a luminance-current-voltage test based on the laser light beam directed out of the first light path to determine operating characteristics of the laser diode 2. For instance, the luminance-current-voltage test may include measuring the threshold current ($I_{th}$), operating voltage ($V_o$), or operating current ($I_{op}$), etc.

In other words, the laser light beam on the first light path separated by the beam splitter 31 may be used by the luminance-current-voltage testing module 36 to obtain other measurements, rather than simply being filtered out on the first light path. It could be seen that the optoelectronic measuring device 3 may be more effectively to utilize the laser light beam and avoid unnecessarily waste of energy, which is meaningful to save energy in practical use. In addition, different from the tradition which requires two test stations to respectively measure the near field parameters of the laser light beam and operating characteristics of the laser diode 2, the optoelectronic measuring device 3 in the present embodiment may not only measure the near field parameters of the laser light beam by the camera 35, but the operating characteristics of the laser diode 2 may also be measured by the luminance-current-voltage testing module 36, further efficiently utilizing the factory space.

In summary, the optoelectronic measuring device provided in the present invention is able to change the distance between the imaging lens and the camera lens by adjusting the optical path adjusting module, such that it is not required to move the objective lens or the imaging lens and that the stability of the optical framework will be maintained. In addition, as the intensity of the laser light beam emitted from the laser diode is very high, in practice most of the laser light beam would be removed from the optical framework to avoid overexposure in the camera. Notably, the optoelectronic measuring device provided in the present invention may utilize the laser light beam, which is supposed to be filtered out, and direct such laser light beam into the luminance-current-voltage testing module, thereby carrying out the goal of integrating multiple measurements.

What is claimed is:

1. An optoelectronic measuring device, comprising:
an objective lens disposed on a first light path for receiving a first testing light and transforming the first testing light into a second testing light;
an imaging lens disposed on the first light path for receiving the second testing light and transforming the second testing light into a third testing light;
a camera disposed on the first light path for measuring a beam characteristic of the third testing light; and
an optical path adjusting module disposed on the first light path and between the imaging lens and the camera, wherein the optical path adjusting module comprises a mirror disposed on the first light path, the mirror moves relatively to the imaging lens according to a test command, and adjusts the distance between the imaging lens and the camera on the first light path to be a first optical distance or a second optical distance;
wherein the mirror reflects the third testing light vertically.

2. The optoelectronic measuring device according to claim 1, wherein when the camera measures the beam characteristic of the third testing light, the camera further measures a beam waist, a divergence angle and a numerical aperture of the third testing light.

3. The optoelectronic measuring device according to claim 1, wherein when the optical path adjusting module moves according to the test command, a relative position between the imaging lens and the camera remains unchanged.

4. The optoelectronic measuring device according to claim 1, further comprising a first filter disposed on the first light path and between the objective lens and the imaging lens for reducing the light intensity of the second testing light.

5. The optoelectronic measuring device according to claim 1, wherein the camera is generally disposed at a focal plane of a light exiting side of the imaging lens on the first light path.

6. The optoelectronic measuring device according to claim 1, wherein the first testing light is emitted from a laser diode, and the laser diode is disposed at a focal plane of a light incident side of the objective lens on the first light path.

7. The optoelectronic measuring device according to claim 1, further comprising:
- a first beam splitter disposed on the first light path for splitting the second testing light into a fourth testing light; and
- a luminance-current-voltage testing module for performing a luminance-current-voltage test on the fourth testing light to determine an operating characteristic of a laser diode.

* * * * *